(12) United States Patent
Suzuki (10) Patent No.: US 8,410,740 B2
(45) Date of Patent: Apr. 2, 2013

(54) ELECTRIC POWER CONVERSION APPARATUS

(75) Inventor: Takashi Suzuki, Obu (JP)

(73) Assignee: Denso Corporation, Kariya (JP)

( * ) Notice: Subject to any disclaimer, the term of this patent is extended or adjusted under 35 U.S.C. 154(b) by 27 days.

(21) Appl. No.: 13/135,642

(22) Filed: Jul. 12, 2011

(65) Prior Publication Data

US 2012/0032625 A1   Feb. 9, 2012

(30) Foreign Application Priority Data

Aug. 6, 2010   (JP) ................................. 2010-177309

(51) Int. Cl.
*G01R 31/02* (2006.01)
(52) U.S. Cl. ..................................................... 318/490
(58) Field of Classification Search .................. 318/801, 318/400.21
See application file for complete search history.

(56) References Cited

U.S. PATENT DOCUMENTS 7,098,624 B2 * 8/2006 Kusaka .......................... 318/727
2011/0156626 A1 * 6/2011 Mukai et al. .............. 318/400.21

FOREIGN PATENT DOCUMENTS

| JP | 2006-50707 | 2/2006 |
|---|---|---|
| JP | 2009-046044 | 3/2009 |
| JP | 2009-055657 | 3/2009 |
| JP | 2009-268332 | 11/2009 |

OTHER PUBLICATIONS

Office Action dated Jul. 13, 2012 in corresponding Japanese Application No. 2010-177309 with English translation.

* cited by examiner

*Primary Examiner* — Lincoln Donovan
*Assistant Examiner* — Zoheb Imtiaz
(74) *Attorney, Agent, or Firm* — Harness, Dickey & Pierce, PLC (57) ABSTRACT

An electric power conversion apparatus converts electric power supplied to a motor having a winding set formed of coils corresponding to a plurality of phases. An inverter part has a plurality of FETs forming switching element pairs, each of which corresponds to each phase of the winding set. Pull-up resistors are provided between the coils and a high-potential side of a battery, respectively. A neutral point voltage detection part detects a neutral point voltage of the winding set. A microcomputer detects abnormality based on the neutral point voltage.

2 Claims, 4 Drawing Sheets

ELECTRIC POWER CONVERSION APPARATUS

CROSS REFERENCE TO RELATED APPLICATION

This application is based on and incorporates herein by reference Japanese patent application No. 2010-177309 filed on Aug. 6, 2010.

FIELD OF THE INVENTION

The present invention relates to an electric power conversion apparatus, which converts electric power supplied to a rotary electric machine.

BACKGROUND OF THE INVENTION

According to a conventional electric power conversion apparatus, which converts electric power supplied to a rotary electric machine, switches over on/off states of a plurality of switching elements. In case that the rotary electric machine is an electric motor, for example, the motor cannot produce desired torque and will damage mechanical devices such as gears coupled to an output shaft of the motor, if the electric power conversion apparatus has failure. According to JP2006-50707A, therefore, a biasing circuit is provided to detect abnormality in electric power supply cables. The biasing circuit applies a bias voltage to an arbitrary one of the power supply cables.

Since voltages of the power supply cables of all phases are detected, the voltages must be detected at many locations and processing of detecting abnormality is complicated.

SUMMARY OF THE INVENTION

It is an object of the present invention to provide an electric power conversion apparatus which detects abnormality by relatively simple processing.

According to the present invention, an electric power conversion apparatus is provided for converting electric power of a power source supplied to a motor having a winding set, which is formed of coils corresponding to a plurality of phases. The electric power conversion apparatus comprises an inverter part, a neutral point detection part and an abnormality detection part. The inverter part has a plurality of switching element pairs corresponding to the plurality of phases of the winding set. Each of the switching element pairs is formed of a high-potential side switching element provided at a high-potential side of the power source and a low-potential side switching element provided at a low-potential side of the power source. The neutral point detection part detects a neutral point voltage of the winding set. The abnormality detection part detects abnormality based on the neutral point voltage detected by the neutral point detection part.

In a first aspect of the present invention, resistors are provided between one ends of the coils of the winding set and the high-potential side of the power source. The neutral point detection part detects, as the neutral point voltage, a voltage developed at a neutral point, to which other ends of the coils of the winding set are connected.

In a second aspect of the present invention, a first resistor and a plurality of second resistors are provided. The first resistor is provided between one of the coils of the winding set and the high-potential side of the power source. The plurality of second resistors has one ends connected to the plurality of coils of the winding set and other ends connected to a connection part. The neutral point detection part detects, as the neutral point voltage of the winding set, a voltage developed at the connection part.

BRIEF DESCRIPTION OF THE DRAWINGS

The foregoing and other objects, features and advantages of the present invention will become more apparent from the following detailed description made with reference to the accompanying drawings. In the drawings.

DETAILED DESCRIPTION OF THE PREFERRED EMBODIMENT

An electric power conversion apparatus according to the present invention will be described below with reference to the drawings. Substantially the same parts are designated by the same reference numerals among a plurality of embodiments.

First Embodiment

Figure 1:
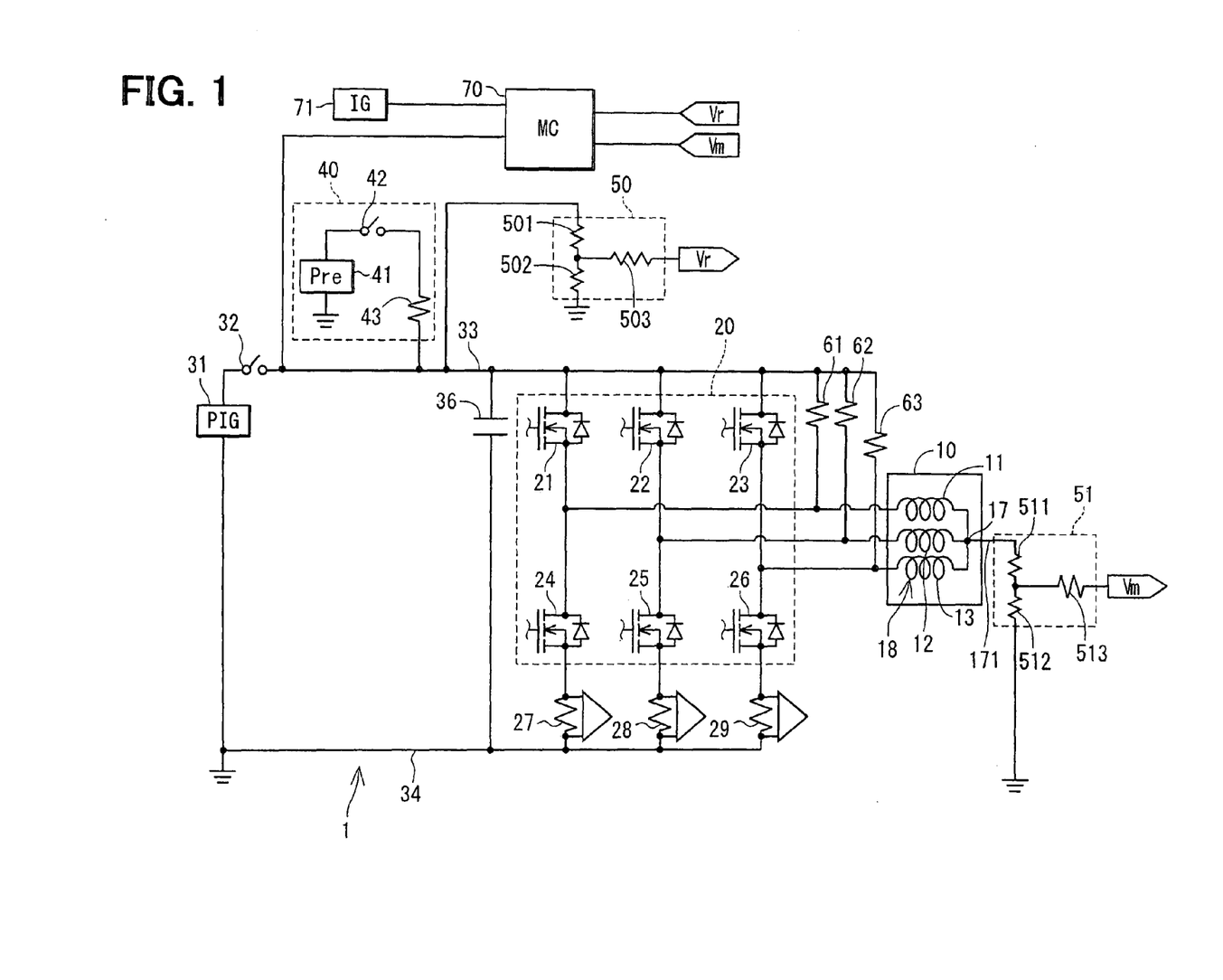
FIG. 1 is a schematic diagram showing an electric power conversion apparatus according to a first embodiment of the present invention.

Referring to FIG. 1, an electric power conversion apparatus 1 according to a first embodiment of the present invention is provided to convert electric power supplied to an electric motor 10, which is a rotary electric machine. The electric power conversion apparatus 1 and the motor 10 are used, for example, in an electric power steering system (EPS), which assists steering operation of a vehicle.

The motor 10 is a brushless motor and has a rotor and a stator, which are not shown. The rotor is a disk-shaped member, on which permanent magnets are fixed to provide magnetic poles. The stator houses and rotatably supports the rotor therein. The stator has protrusions, which protrude in the radially inward direction and are arranged at every predetermined angular interval in the circumferential direction. A U-phase coil 11, a V-phase coil 12 and a W-phase coil 13, which are shown in FIG. 1, are wound about these protrusions. The U-phase coil 11, the V-phase coil 12 and the W-phase coil 13 are windings for U-phase, V-phase and W-phase and jointly form a winding set 18 of the motor 10. Each of the U-phase coil 11, the V-phase coil 12 and the W-phase coil 13 is shown as a single coil. However, it may be formed of a plurality of coils. The U-phase coil 11, the V-phase coil 12 and the W-phase coil 13 are connected one another at a neutral point 17. Thus, the U-phase coil 11, the V-phase coil 12 and the W-phase coil 13 are star-connected in a Y-shape.

The electric power conversion apparatus 1 includes an inverter circuit (part) 20, a neutral point voltage detection circuit (part) 51, pull-up resistors 61 to 63, a microcomputer 70 and the like. The inverter circuit 20 is a three-phase inverter including six switching elements 21 to 26, which are connected in a bridge circuit form to switch over power supply from a battery (PIG) 31 to each of the U-phase coil 11, the V-phase coil 12 and the W-phase coil 13 of the winding set 18. Each of the switching elements 21 to 26 is a metal-oxide semiconductor field-effect transistor (MOSFET). The switching elements 21 to 26 are referred to as FET 21 to 26.

The three FETs 21 to 23 have drains connected to the positive-pole side of the battery 31, which is an electric power source. The FETs 21 to 23 have sources connected to drains of the FET 24 to 26. The FETs 24 to 26 have sources connected to the ground through shunt resistors 27 to 29.

A junction between the FET 21 and the FET 24, which are paired, is connected to one end of the U-phase coil 11. A junction between the FET 22 and the FET 25, which are paired, is connected to one end of the V-phase coil 12. A junction between the FET 23 and the FET 26, which are paired, is connected to one end of the W-phase coil 13.

The shunt resistors 27 to 29 are connected between the FETs 24 to 26 and the ground, respectively. Specifically, the shunt resistor 27 is connected between the FET 24 and the ground. The shunt resistor 28 is connected between the FET 25 and the ground. The shunt resistor 29 is connected between the FET 26 and the ground. The shunt resistors 27 to 29 are provided to detect voltages (or currents) of currents supplied thereto for detecting currents supplied to the coils 11 to 13, respectively.

The FETs 21 to 23 correspond to high-potential side switching elements in the inverter circuit 20. The FETs 24 to 26 correspond to low-potential side switching elements in the inverter circuit 20. The high-potential side switching element is referred to as a high side FET and the low-potential side switching element is referred to as a low side FET. The FET 21 and the FET 24 in a pair, the FET 22 and the FET 25 in a pair and the FET 23 and the FET 26 in a pair, correspond to switching element pairs, respectively.

A current path from the positive polarity side of the battery 31 to the drains of the high side FETs 21 to 23 forms a battery line 33. A current path from the shunt resistors 27 to 29 to the ground forms a ground line 34. The battery line 33 corresponds to a high-potential side of the power source, and the ground line 34 corresponds to a low-potential side of the power source. In the current path from the positive polarity side of the battery 31 to the ground, the battery 31 side is referred to as an input side and the ground side is referred to as an output side.

A power source relay 32 is provided in the battery line 33 between the positive-polarity side of the battery 31 and the inverter circuit 20. The power source relay 32 is controlled to turn on and off by the microcomputer 70 to permit and interrupt flow of current between the battery 31 and the inverter circuit 20 and the motor 10. The power source relay 32 is a normally-open type power source relay. The power source relay 32 is in an open-state (off-state) and interrupts the current flow when no on-command is received from the microcomputer 70. The power source relay 32 is in a closed-state (on-state) and permits the current flow when an on-command is received from the microcomputer 70.

A capacitor 36 is provided with its one end connected to the battery line 33 between the power source relay 32 and the inverter circuit 20 and the other end connected to the ground line 34 between the inverter circuit 20 and the battery 31. The capacitor 36 is provided between the battery 31 and the inverter circuit 20. The capacitor 36 stores electric charge to assist power supply to the FETs 21 to 26 and reduces ripple current, which arises when the electric power is supplied from the battery 31 to the motor 10.

A pre-charge circuit 40 is connected between a junction between the capacitor 36 and the battery line 33 and the power source relay 32. The pre-charge circuit 40 has a pre-charge battery 41, a pre-charge relay 42 and a pre-charge resistor 43. The pre-charge battery 41 supplies less voltage than the battery 31. The voltage of the battery 31 (referred to as a battery voltage Vpig) is 12V (volts) and the voltage of the pre-charge battery 41 (referred to as a pre-charge voltage Vpre) is 5V.

The pre-charge relay 42 is controlled to turn on and off by the microcomputer 70 to permit and interrupt flow of current between the pre-charge battery 41 and the battery line 33. The pre-charge resistor 43 is connected between the pre-charge relay 42 and the battery line 33. The pre-charge resistor 43 is provided to prevent a large current from flowing temporarily from the pre-charge battery 41 to the capacitor 36, when the pre-charge relay 42 is controlled to turn on Resistance of the pre-charge resistor 43 is set to an arbitrary resistance value, for example, 10 Ω or 100Ω. The pre-charge resistor 43 need not be provided, if a function of limiting an excessive output from the pre-charge battery 41 is provided.

A relay output side voltage detection circuit (part) 50 detects a voltage (referred to as a relay output side power source voltage Vr) of the battery line 33 at the output (downstream) side of the power source relay 32. The relay output side voltage detection circuit 50 has one end, which is connected to the battery line 33 at a point between the pre-charge circuit 40 and the capacitor 36, and the other end, which is connected to the ground. The detection circuit 50 includes three resistors 501, 502 and 503. The resistors 501 and 502 connected in series are voltage dividing resistors. Resistances of the resistors 501 and 502 are set so that a voltage applied to a junction between the resistors 501 and 502 may be detected by the microcomputer 70. The resistor 503 connected between the junction of the resistors 501 and 502 and the microcomputer 70 is provided to prevent an excessive current from flowing to the microcomputer 70.

A neutral point voltage detection circuit 51 is provided for detecting a neutral point voltage Vm of the winding set 18. The neutral point voltage detection circuit 51 detects a voltage (referred to as a neutral point voltage Vm), which is developed at the neutral point 17 of the U-phase coil 11, the V-phase coil 12 and the W-phase coil 13. The neutral point voltage detection circuit 51 has one end, which is connected to the neutral point 17, and the other end, which is connected to the ground. A wire 171 connecting the neutral point 17 and the neutral point voltage detection circuit 51 is taken out from the motor 10 separately from other wires, which are taken out to the inverter circuit 20 with respect to respective phases of the coils 11 to 13.

The detection circuit 51 has three resistors 511, 512 and 513 similarly to the relay output side voltage detection circuit 50. The resistors 511 and 512 connected in series are voltage dividing resistors. Resistances of the resistors 511 and 512 are set so that a voltage applied to a junction between the resistors 511 and 512 may be detected by the microcomputer 70. The resistor 513 connected between the junction of the resistors 511 and 512 and the microcomputer 70 is provided to prevent an excessive current from flowing to the microcomputer 70.

Pull-up resistors 61 to 63 are provided between the phase coils 11, 12, 13 and the battery line 33, which is the high-potential side, respectively. Specifically, the pull-up resistor 61 is connected between the U-phase coil 11 and the high-potential side of the battery 31. The pull-up resistor 62 is connected between the V-phase coil 12 and the high-potential side of the battery 31. The pull-up resistor 61 is connected between the W-phase coil 13 and the high-potential side of the battery 31. That is, the pull-up resistor 61 connects the battery line 33 and the U-phase coil 11 at the output side of the power source relay 32. The pull-up resistor 62 connects the battery line 33 and the V-phase coil 12 at the output side of the power source relay 32. The pull-up resistor 61 connects the battery line 33 and the W-phase coil 13 at the output side of the power source relay 32. The U-phase, the V-phase and the W-phase are thus pulled up by the pull-up resistors 61 to 63, respectively.

Resistances of various resistors used in the electric power conversion apparatus 1 is summarized here. All the resistances of the pull-up resistor 61 (referred to as RpullU), the pull-up resistor 62 (referred to as RpullV) and the pull-up resistor 63 (referred to as RpullW) are 10,500Ω. The resistance of the resistor 511 (referred to as RupM) forming the neutral point voltage detection circuit 51 is 0Ω. The resistance of the resistor 512 (referred to as RdownM) is 1,000Ω. The resistance of the resistor 513 (referred to as RownM) is 2,400Ω. Further, all the resistances of the U-phase coil 11 (referred to as RmU), the V-phase coil 12 (referred to as RmV) and the W-phase coil 13 (referred to as RmW) are 0.01 Ω.

The microcomputer 70 includes integrated circuits, and is connected to various parts and detection means of the electric power conversion apparatus 1. The microcomputer 70 has a memory circuit, in which a program is stored, and executes various processing routines as instructed by, the program to the control operations of the various parts and the like.

The microcomputer 70 is connected to the FETs 21 to 26, the power source relay 32, the pre-charge relay 42 and so on. Signal lines for those parts are not shown in FIG. 1 for brevity. The microcomputer 70 is connected to an ignition power source 71. When an operator of a vehicle turns on an ignition key, electric power is supplied from the ignition power source 71 to the microcomputer 70 so that the microcomputer 70 may starts its various processing routine.

The microcomputer 70 regulates torque and rotation speed of the motor 10 by switching over on/off of the FETs 21 to 26 by PWM control in the known manner. When the power source relay 32 is being controlled to turn on and permit the power supply to the inverter circuit 20, the microcomputer 70 switches over on/off of the FETs 21 to 26. Thus, DC current supplied from the battery 31 is converted to sinusoidal currents, which are different in phase one another depending on each phase. The currents converted into the sinusoidal currents of different phases (three phases) are supplied to the U-phase coil 11, the V-phase coil 12 and the W-phase coil 13 so that the motor 10 is driven to rotate by magnetic field generated by the current supply. Thus the microcomputer 70 controls driving of the motor 10 by switching over on/off of the FETs 21 to 26. The microcomputer 70 acquires the relay output side voltage detection voltage Vr from the relay output side voltage detection circuit 50. The microcomputer 70 also acquires the voltage Vm from the neutral point voltage detection circuit 51.

Figure 2:
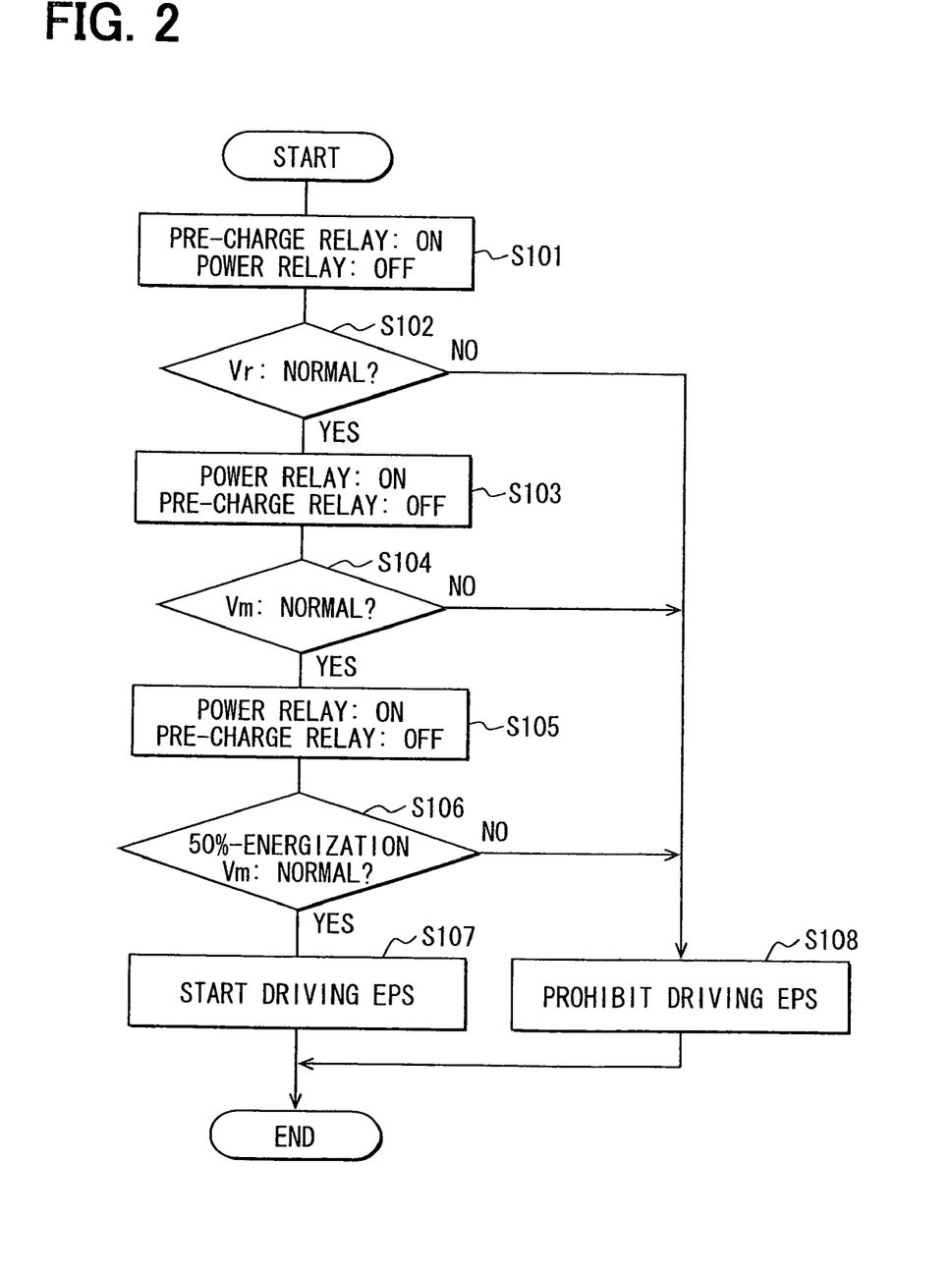
FIG. 2 is a flowchart showing abnormality detection processing routine executed in the first embodiment of the present invention.

The microcomputer 70 detects abnormality in the inverter circuit 20, the coils 11 to 13 and points between the inverter circuit 20 and the coils 11 to 13. Abnormality detection processing routine is described next with reference to a flowchart shown in FIG. 2. The processing routine shown in FIG. 2 is executed when the ignition power source 71 is turned on.

At first step S101 (step is simply referred to as S below), the pre-charge relay 42 is turned on. At this moment, the power source relay 32 is not turned on and is maintained in the off-state. At S102, the relay output side voltage Vr is acquired from the relay output side voltage detection circuit 50 and it is checked whether the relay output side voltage Vr is normal. Since the power source relay 32 is in the off-state and the pre-charge relay 42 is in the on-state, the relay output side voltage Vr at the normal time becomes the pre-charge voltage Vpre, that is, 5V. Thus, if the relay output side voltage Vr is within a predetermined range including the pre-charge voltage Vpre, 5V, it is determined that the relay output side voltage Vr is normal. For instance, it is determined to be normal if $4.5 \leq Vr \leq 5.5$. If it is determined that the voltage is not normal (S102:NO), that is, Vr<4.5 or Vr>5.5, S108 is executed. If Vr≈0, it can be specified that the capacitor 36 has a short-circuit failure, the pre-charge battery 41 has a failure or the pre-charge relay 42 has a failure. If Vr≈12, it can be specified that the power source relay 32 has a short-circuit failure. If it is determined that the relay output side voltage Vr is normal (S102:YES), that is, $4.5 \leq Vr \leq 5.5$, S103 is executed.

At S103, the power source relay 32 is turned on and the pre-charge relay 42 is turned off. At S104, the neutral point voltage Vm is acquired from the neutral point voltage detection circuit 51 and it is checked whether the neutral point voltage Vm is normal. The neutral point voltage Vm is calculated by the following equation (1).

$$Vm = Vpig \times (RdownM)/(Rp3 + RupM + RdownM) \qquad (1)$$

Here, Rp3 is a combined resistance of the pull-up resistor 61, the U-phase coil 11, the pull-up resistor 62, the V-phase coil 12, the pull-up resistor 63 and the W-phase coil 13. It is calculated by the following equation (2).

$$Rp3 = \{(RpullU+RmU) \times (RpullV+RmV)+(RpullW+RmW)\}/\{(RpullU+RmU)(RpullV+RmV)+(RpullV+RmV)(RpullW+RmW)+(RpullW+RmW)(RpullU+RmU)\} \qquad (2)$$

Assuming that the battery voltage Vpig is 12V and the resistances of each resistance are as described above, the neutral point voltage Vm is normally 2.66 V.

If the neutral point voltage Vm is within a predetermined range including a normal value 2.66 calculated by the foregoing equation (1), it is determined that the voltage Vm is normal. If $2.4 \leq Vm \leq 2.8$, for example, it is determined that the voltage Vm is normal. If it is determined that the voltage Vm is not normal (S104:NO), that is, Vm<2.4 or Vm>2.8, S108 is executed. It is possible to specify not only presence and absence of abnormality but also a location of abnormality based on the voltage Vm. The location of abnormality is specified in a manner described later. If it is determined that the voltage Vm is normal (S104:YES), that is, $2.4 \leq Vm \leq 2.8$, S105 is executed.

At S105, the power source relay 32 is turned on and the pre-charge relay 42 is turned off. At S106, it is checked whether the neutral point voltage Vm, which is developed when the FETs 21 to 26 are driven phase by phase with 50% duty, is normal. Specifically, the voltage Vm, which is developed when the U-phase high side FET 21 and the U-phase low side FET 24 are driven with 50% duty, is acquired. It is checked whether the acquired neutral point voltage Vm is normal. Further, the voltage Vm, which is developed when the V-phase high side FET 22 and the V-phase low side FET 25 are driven with 50% duty, is acquired. It is checked whether the acquired neutral point voltage Vm is normal. Still further, the voltage Vm, which is developed when the W-phase high side FET 23 and the W-phase low side FET 26 are driven with 50% duty, is acquired. It is checked whether the acquired neutral point voltage Vm is normal.

The neutral point voltage Vm, which is developed when the FETs of each phase are driven with 50% duty under normal condition, is calculated as follows. That is, the neutral voltages Vm, which are developed when the U-phase, the V-phase and the W-phase are driven with 50% duty, are expressed as equations (3-1), (3-2) and (3-3), respectively.

$$Vm = Vpig \times 0.5 \times RdownM/(RmU + RdownM) \quad (3\text{-}1)$$

$$Vm = Vpig \times 0.5 \times RdownM/(RmV + RdownM) \quad (3\text{-}2)$$

$$Vm = Vpig \times 0.5 \times RdownM/(RmW + RdownM) \quad (3\text{-}3)$$

If the voltage Vm is within a predetermined range including a value calculated by the equations (3-1) to (3-3), it is determined that the voltage provided for driving each phase FET with 50% duty is normal. Specifically, it is determined that the voltage is normal, if the voltages are greater than values, which are product of 0.9 and the calculated values of the foregoing equations (3-1) to (3-3), and less than values, which are product of 1.1 and the calculated values of the equations (3-1) to (3-3). If it is determined that the neutral point voltage Vm developed when each phase FET is driven with 50% duty is not normal (S106:NO), S108 is executed. If it is determined that the voltage Vm developed when each phase FET is driven with 50% duty is normal, S107 is executed.

At S107, driving the EPS is started. If it is determined that the relay output side voltage Vr is not normal (S102: NO), the voltage Vm is not normal (S104:NO) or the voltage Vm developed when each phase FET is driven with 50% duty is not normal (S106:NO), S108 is executed. At S108, driving EPS is prohibited and this routine is finished. Specifically, the power source relay 32 is turned off when the power source relay 32 is in the on-state, for example.

As described below, the location of abnormality is specified based on the voltage Vm, which is developed when the power source relay 32 is turned on and the pre-charge relay 42 is turned off. If any one of the high side FETs 21 to 23 has a short-circuit failure, the voltage Vm is calculated by the following equation (4).

$$Vm = Vpig \times \{(RdownM)/(RupM + RdownM)\} \quad (4)$$

If any one of the low side FETs 24 to 26 has a short-circuit failure, the voltage Vm takes the following value.

$$Vm = 0 \quad (5)$$

If the U-phase wire has a breakage, the voltage Vm is calculated by the following equation (6).

$$Vm = Vpig \times (RdownM)/(Rp2u + RupM + RdownM) \quad (6)$$

Here, Rp2u is a combined resistance of the pull-up resistor 62, the V-phase coil 12, the pull-up resistor 63 and the W-phase coil 13. It is calculated by the following equation (7).

$$Rp2u = \{(RpullV + RmV) \times (RpullW + RmW)\}/\{(RpullV + RmV) + (RpullW + RmW)\} \quad (7)$$

The voltage Vm becomes 1.92V when the U-phase wire breaks, assuming that the battery voltage Vpig is 12V and the resistances are as described above.

If the V-phase wire has a breakage, the voltage Vm is calculated by the following equation (8).

$$Vm = Vpig \times (RdownM)/(Rp2v + RupM + RdownM) \quad (8)$$

Here, Rp2v is a combined resistance of the pull-up resistor 61, the U-phase coil 11, the pull-up resistor 63 and the W-phase coil 13. It is calculated by the following equation (9).

$$Rp2v = \{(RpullU + RmU) \times (RpullW + RmW)\}/\{(RpullU + RmU) + (RpullW + RmW)\} \quad (9)$$

The voltage Vm becomes 1.92V when the V-phase wire breaks, assuming that the battery voltage Vpig is 12V and the resistances are as described above.

If the W-phase wire has a breakage, the voltage Vm is calculated by the following equation (10).

$$Vm = Vpig \times (RdownM)/(Rp2w + RupM + RdownM) \quad (10)$$

Here, Rp2w is a combined resistance of the pull-up resistor 61, the U-phase coil 11, the pull-up resistor 63 and the V-phase coil 12. It is calculated by the following equation (11).

$$Rp2w = \{(RpullU + RmU) \times (RpullV + RmV)\}/\{(RpullU + RmU) + (RpullV + RmV)\} \quad (11)$$

The voltage Vm becomes 1.92V when the W-phase wire breaks, assuming that the battery voltage Vpig is 12V and the resistances are as described above.

It is noted that the U-phase wire includes not only the U-phase coil 11 but also a wire, which extends from the junction between the U-phase high side FET 21 and the U-phase low side FET 24 to the U-phase coil 11. Similarly, the V-phase wire includes not only the V-phase coil 12 but also a wire, which extends from the junction between the V-phase high side FET 22 and the V-phase low side FET 25 to the V-phase coil 12. Further, the W-phase wire includes not only the W-phase coil 13 but also a wire, which extends from the junction between the W-phase high side FET 23 and the W-phase low side FET 26 to the V-phase coil 13.

As understood from the equations (4), (5), (6), (8) and (10), the voltage Vm developed when the power source relay 32 is turned on and the pre-charge relay 42 is turned off becomes different depending on the location of abnormality. It is therefore possible to specify the location of abnormality based on the voltage Vm. For example, presence of the abnormality may be specified, if the voltage Vm is within a predetermined range, which is set to include therein the value calculated by the equations (4), (5), (6), (8) and (10). Since the pull-up resistors 61 to 63 have the same resistance, the neutral point voltages Vm become the same whether the U-phase wire, the V-phase wire or the W-phase wire has a breakage. If it is necessary to differentiate the wire breakage phase by phase, each location of abnormality may be specified by other routine different from the present routine. The pull-up resistors 61 to 63 have the same resistance according to the present embodiment. Therefore, if the location of abnormality need not be specified or is specified by a separate routine, the width of an upper limit and a lower limit, which are threshold values for abnormality detection can be widened so that the abnormality can be detected readily.

As described above, according to the first embodiment, the electric power conversion apparatus 1 converts the electric power supplied to the motor 10 having the winding set 18 formed of the coils 11 to 13 corresponding to a plurality of phases (three phases, for example). The inverter circuit 20 has a plurality of FETs 21 to 26 forming switching element pairs, each of which correspond to each phase of the U-phase coil 11, the V-phase coil 12 and the W-phase coil 13, by the high side FETs 21 to 23 and the low side FETs 24 to 26. The pull-up resistors 61 to 63 are provided between the coils 11 to 13 and the high-potential side of the battery 31, respectively. The neutral point voltage detection circuit 51 detects the neutral point voltage Vm of the winding set 18. The microcomputer 70 detects abnormality based on the neutral point voltage Vm.

The voltage developed at the neutral point 17 of the coils 11 to 13 is detected as the voltage Vm, and voltages applied to the phase coils 11 to 13 are not detected. Since the number of locations, at which voltages are detected, is thus reduced, the number of circuits or parts required for voltage detection is reduced and cost is also reduced. The voltage Vm becomes different depending on whether abnormality is present or where the abnormality is present. Thus, the number of locations, at which the voltages are detected can be reduced and the abnormality can be detected in a relatively simple construction.

The motor 10 is used in the EPS. If abnormality such as breakage of the coils 11 to 13 or the like arises, it is likely that ripple of torque applied to a steering wheel of a vehicle increases and causes uncomfortable feeling to a driver. It is also likely that no assist torque is outputted at some steering angles. The abnormality such as breakage of the coils 11 to 13 or the like is detected. It is therefore possible to notify a driver of abnormality speedily by an alarm device such as a warning light or switch over a mode of driving the motor 10 to a failure-time mode. Thus, safety is enhanced. The microcomputer 70 operates as an abnormality detection part. S104 in FIG. 2 performs a function of the abnormality detection part.

Second Embodiment

Figure 3:
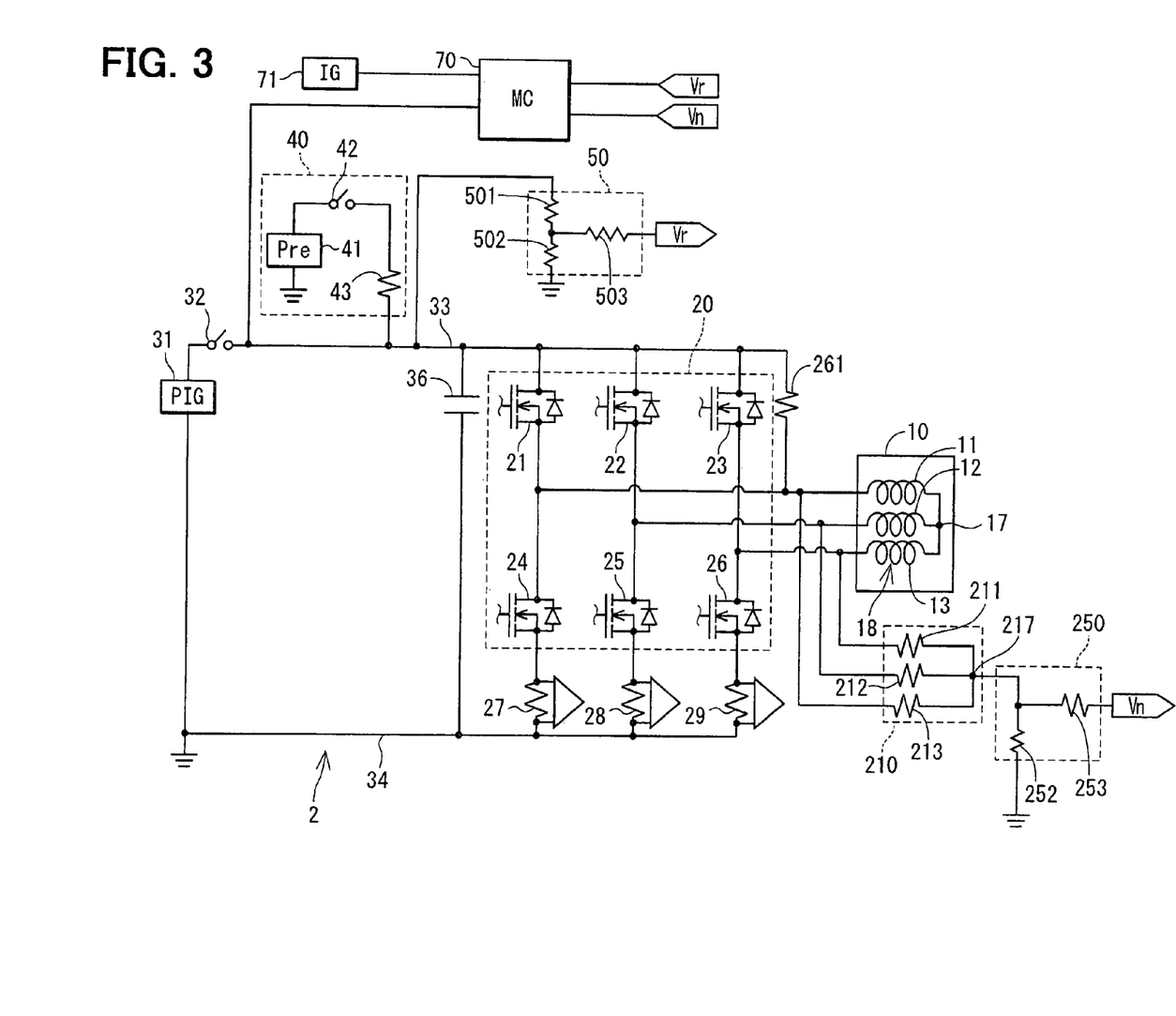
FIG. 3 is a schematic diagram showing an electric power conversion apparatus according to a second embodiment of the present invention.

An electric power conversion apparatus 2 according to a second embodiment of the present invention is shown in FIG. 3. Differently from the first embodiment, no pull-up resistors for pulling up the V-phase and the W-phase are provided. Only one pull-up resistor 261 is provided as a first resistor between the U-phase coil 11 and the high-potential side of the battery 31. The pull-up resistor 261 connects the battery line 33 and the U-phase coil 11 at the output side of the power source relay 32.

The electric power conversion apparatus 2 has a pseudo-neutral point forming circuit (part) 210. The pseudo-neutral point forming circuit 210 includes resistors 211, 212 and 213. The resistor 211 has one end connected to the U-phase coil 11. The resistor 212 has one end connected to the V-phase coil 12. The resistor 213 has one end connected to the W-phase coil 13. The resistors 211 to 213 connected to the coils 11 to 13 are provided outside the motor 10. The resistors 211 to 213 have other ends connected to one connection point 217. The resistors 211 to 213 are provided as second resistors.

The voltage developed at the connection point 217 of the pseudo-neutral point forming circuit 210 is equal to the voltage developed at the neutral point 17 of the motor 10. Therefore, the voltage developed at the connection point 217 of the pseudo-neutral point forming circuit 210 is taken as the neutral point voltage. The voltage developed at the connection point 217 is referred to as a pseudo-neutral point voltage Vn.

A pseudo-neutral point voltage detection circuit (part) 250 detects, as a neutral point voltage detection part, detects the voltage developed at the connection point 217 of the pseudo-neutral point forming circuit 210. The pseudo-neutral point voltage detection circuit 250 is connected to the connection point 217 at one end and to the ground at the other end. The pseudo-neutral point voltage detection circuit 250 has two resistors 252 and 253. The resistance of the resistor 252 connected between the connection point 217 and the ground is so set that a voltage developed between the connection point 217 and the resistor 252 is detectable by the microcomputer 70. The resistor 253 connected between a junction of the connection point 217 and the resistor 252 and the microcomputer 70 is provided to prevent excessive current from flowing to the microcomputer 70.

Resistances of various resistors used in the electric power conversion apparatus 2 is summarized here. The resistance of the pull-up resistor 261 (referred to as Rpull) is 1,000Ω. The resistance of the resistor 211 of the pseudo-neutral point forming circuit 210 (referred to as RnU), the resistance of the resistor 212 (referred to as RnV) and the resistance of the resistor 213 (referred to as RnW) are all 4,200Ω. The resistance of the resistor 252 of the pseudo-neutral point voltage detection circuit 250 (referred to as RownN) is 1,000Ω. Further, the resistance of the resistor 253 (referred to as RdampN) is 2,400Ω. Similarly to the first embodiment, the resistance RmU of the U-phase coil 11, the resistance RmV of the V-phase coil 12 and the resistance RmW of the W-phase coil 13 are all 0.01Ω. That is, the resistances of the resistors 211 to 213 are sufficiently greater in comparison to the resistances of the coils 11 to 13.

Abnormality detection processing routine in the second embodiment is generally similar to that shown in FIG. 2. The following description is made only with respect to a part different from the first embodiment to omit repetition of the same explanation. At S104, the pseudo-neutral point voltage Vn is acquired from the pseudo-neutral point voltage detection circuit 250 and it is checked whether the acquired voltage Vn is normal.

The pseudo-neutral point voltage Vn, which is developed under the normal condition, is calculated by the following equation (12).

$$Vn = Vpig \times (RdownN)/(RpullU2 + Rp4 + RdownN) \tag{12}$$

Here, Rp4 is a combined resistance of the resistor 211, the resistor 212, the V-phase coil 12, the resistor 213 and the W-phase coil 13. It is calculated by the following equation (13).

$$Rp4 = (RnU) \times (RnV+RmV+RmU) \times (RnW+RmW+RmU)\{ \\ (RnU)(RnV+RmV+RmU)+(RnV+RmV+RmU) \\ (RnW+RmW+RmU)+(RnW+RmW+RmU)(RnU)\} \tag{13}$$

Assuming that the battery voltage Vpig is 12V and the resistances of the resistors are as described above, the pseudo-neutral point voltage Vn is normally 3.53 V.

If the pseudo-neutral point voltage Vn is within a predetermined range including a normal value 3.53 calculated by the foregoing equation (12), it is determined that the pseudo-neutral point voltage Vn is normal. If $3.2 \leq Vn \leq 3.8$, for example, it is determined that the pseudo-neutral point voltage Vn is normal. If it is determined that the pseudo-neutral point voltage Vn is not normal (S104:NO), that is, Vn<3.2 or Vn>3.8, S108 is executed. If it is determined that the pseudo-neutral point voltage Vn is normal (S104:YES), that is, $3.2 \leq Vn \leq 3.8$, S105 is executed.

At S106, it is checked whether the pseudo-neutral point voltage Vn, which is developed when the FETs 21 to 26 are driven phase by phase with 50% duty, is normal. The pseudo-neutral point voltage Vn, which is developed when the FETs of each phase is driven with 50% duty under normal condition, is calculated as follows. That is, the neutral voltages Vn, which are developed when the U-phase, the V-phase and the W-phase are driven with 50% duty, are expressed as equations (14-1), (14-2) and (14-3), respectively.

$$Vn = Vpig \times 0.5 \times RdownN/(Rp4 + RdownN) \tag{14-1}$$

$$Vn = Vpig \times 0.5 \times RdownN/(Rp5 + RdownN) \tag{14-2}$$

$$Vm = Vpig \times 0.5 \times RdownN/(Rp6 + RdownN) \tag{14-3}$$

Rp4 in the equation (14-1) is calculated as defied by the equation (13). However, Rp5 in the equation (14-4) and Rp6 in the equation (14-3) are calculated by the equations (14-4) and (14-5), respectively.

$$Rp5 = (RnU+RmU+RmV) \times (RnV) \times (RnW+RmW+RmV)/\{ \\ (RnU+RmU+RmV)(RnV)+(RnV)(RnW+RmW+ \\ RmV)+(RnW+RmW+RmV)(RnU+RmU+RmV)\} \tag{14-4}$$

$$Rp6=(RnU+RmU+RmW)\times(RnV+RmV+RmW)\times(RnW)/\{(RnU+RmU+RmW)(RnV+RmV+RmW)+(RnV+RmV+RmW)(RnW)+(RnW)(RnU+RmU+RmW)\} \quad (14\text{-}5)$$

If the pseudo-neutral point voltage Vn is within a predetermined range including a value calculated by the equations (14-1) to (14-3), it is determined that the terminal voltage provided for driving each phase FET with 50% duty is normal. Specifically, similarly to the first embodiment, it is determined that the voltage is normal, if the voltage is greater than values, which are product of 0.9 and the calculated values of the foregoing equations (14-1) to (14-3), and less than values, which are product of 1.1 and the calculated values of the equations (14-1) to (14-3). If it is determined that the pseudo-neutral point voltage Vn developed when each phase FET is driven with 50% duty is not normal (S106:NO), S108 is executed. If the pseudo-neutral point voltage Vn developed when each phase FET is driven with 50% duty is normal (S106:YES), S107 is executed.

As described below, the location of abnormality is specified based on the pseudo-neutral point voltage Vn, which is developed when the power source relay 32 is turned on and the pre-charge relay 42 is turned off. If any one of the high side FETs 21 to 23 has a short-circuit failure, the pseudo-neutral point voltage Vn is calculated by the following equation (15).

$$Vn=Vpig\times(RdownN)/(Rp4+RdownN) \quad (15)$$

If any one of the low side FETs 24 to 26 has a short-circuit failure, the pseudo-neutral point voltage Vn takes the following value.

$$Vn=0 \quad (16)$$

If the U-phase wire has a breakage, the pseudo-neutral point voltage Vn is calculated by the following equation (17).

$$Vn=Vpig\times(RdownN)/(RpullU/2+RdownN) \quad (17)$$

Assuming that the battery voltage Vpig is 12V and the resistances of the resistors are as described above, the pseudo-neutral point voltage Vn is 1.94V when the U-phase wire breaks.

If the V-phase wire has a breakage, the pseudo-neutral point voltage Vn is calculated by the following equation (18).

$$Vn=Vpig\times(RdownN)/(Rp4v+RdownN) \quad (18)$$

Here, Rp4v is a combined resistance of the resistor 213, the W-phase coil 13, the U-phase coil 11 and the resistor 211. It is calculated by the following equation (19).

$$Rp2v=\{(RnU)\times(RnW+RmW+RmU)\}/\{(RnU)+(RnW+RmW+RmU)\} \quad (19)$$

Assuming that the battery voltage Vpig is 12V and the resistances are as described above, the pseudo-neutral voltage Vn becomes 2.93V when the V-phase wire breaks.

If the W-phase wire has a breakage, the pseudo-neutral point voltage Vn is calculated by the following equation (20).

$$Vn=Vpig\times(RdownN)/(Rp4w+RdownN) \quad (20)$$

Here, Rp4w is a combined resistance of the pull-up resistor 212, the V-phase coil 12 and the resistor 211. It is calculated by the following equation (21).

$$Rp4w=\{(RnU)\times(RnV+RmV+RmU)\}/\{(RnU)+(RnV+RmV+RmU)\} \quad (21)$$

The pseudo-neutral point voltage Vn becomes 2.93V when the W-phase wire breaks, assuming that the battery voltage Vpig is 12V and the resistances are as described above.

As understood from the equations (15) to (18) and (20), the pseudo-neutral point voltage Vn developed when the power source relay 32 is turned on and the pre-charge relay 42 is turned off becomes different depending on the location of abnormality. It is possible to specify the location of abnormality based on the pseudo-neutral point voltage Vn. For example, presence of the abnormality may be specified, if the pseudo-neutral point voltage Vn is within a predetermined range, which is set to include therein the value calculated by the equations (15) to (18) and (20). It is noted that only the U-phase is pulled up by the resistor 261 and the V-phase and the W-phase are not pulled up. If the V-phase wire or the W-phase wire, which is not pulled up, has a breakage, the pseudo-neutral point voltage Vn takes the same value. If it is necessary to differentiate the wire breakage phase by phase, each location of abnormality may be specified by other processing routine different from the present processing routine.

As described above, the electric power conversion apparatus 2 converts the electric power supplied to the motor 10 having the winding set 18 formed of the coils 11 to 13 corresponding to a plurality of phases. The inverter circuit 20 has a plurality of FETs 21 to 26 forming switching element pairs, each of which correspond to each phase of the U-phase coil 11, the V-phase coil 12 and the W-phase coil 13, by the high side FETs 21 to 23 and the low side FETs 24 to 26. The pull-up resistor 261 is provided between the U-phase coil 11 and the high-potential side of the battery 31. The resistors 211 to 213 are provided in correspondence to the coils 11 to 13, respectively. One ends of the resistors 211 to 213 are connected one another at the connection point 217, and the other ends of the same are connected to the coils 11 to 13, respectively. The pseudo-neutral point voltage detection circuit 250 detects, as the neutral point voltage, the pseudo neutral point voltage Vn developed at the connection point 217. The microcomputer 70 detects abnormality based on the pseudo-neutral point voltage Vn.

The pseudo-neutral point voltage Vn, which is developed at the neutral point 217 of the resistors 211 to 213 provided in correspondence to the coils 11 to 13, becomes the same as the voltage developed at the neutral point 17 of the coils 11 to 13. Since the abnormality is detected based on the pseudo-neutral point voltage Vn by assuming the pseudo-neutral point voltage Vn developed at the connection point 217 as the neutral point voltage. As a result, the number of locations, at which voltages are detected, is thus reduced. The number of parts required for voltage detection is reduced and cost is also reduced. The pseudo-neutral point voltage Vn becomes different depending on whether abnormality is present or where the abnormality is present. Thus, the number of locations, at which the voltages are detected can be reduced and the abnormality can be detected in a relatively simple construction.

According to the present embodiment, the coils 11 to 13 and the resistors 211 to 213 are connected outside the motor 10, it is not necessary to separately take out a wire from the motor 10 for detecting the neutral point voltage. Thus, the neutral point voltage can be detected without changing the construction of the motor 10.

The motor 10 is used in the EPS. If abnormality such as breakage of the coils 11 to 13 or the like arises, it is likely that ripple of torque applied to a steering wheel increases and gives uncomfortable feeling to a driver. It is also likely that no assist torque is outputted at some steering angles. However, the abnormality such as breakage of the coils 11 to 13 or the like is detected. It is therefore possible to notify a driver of abnormality speedily by an alarm device such as a warning light or switch over a mode of driving the motor 10 to a failure-time mode. Thus, safety is enhanced.

Third Embodiment

Figure 4:
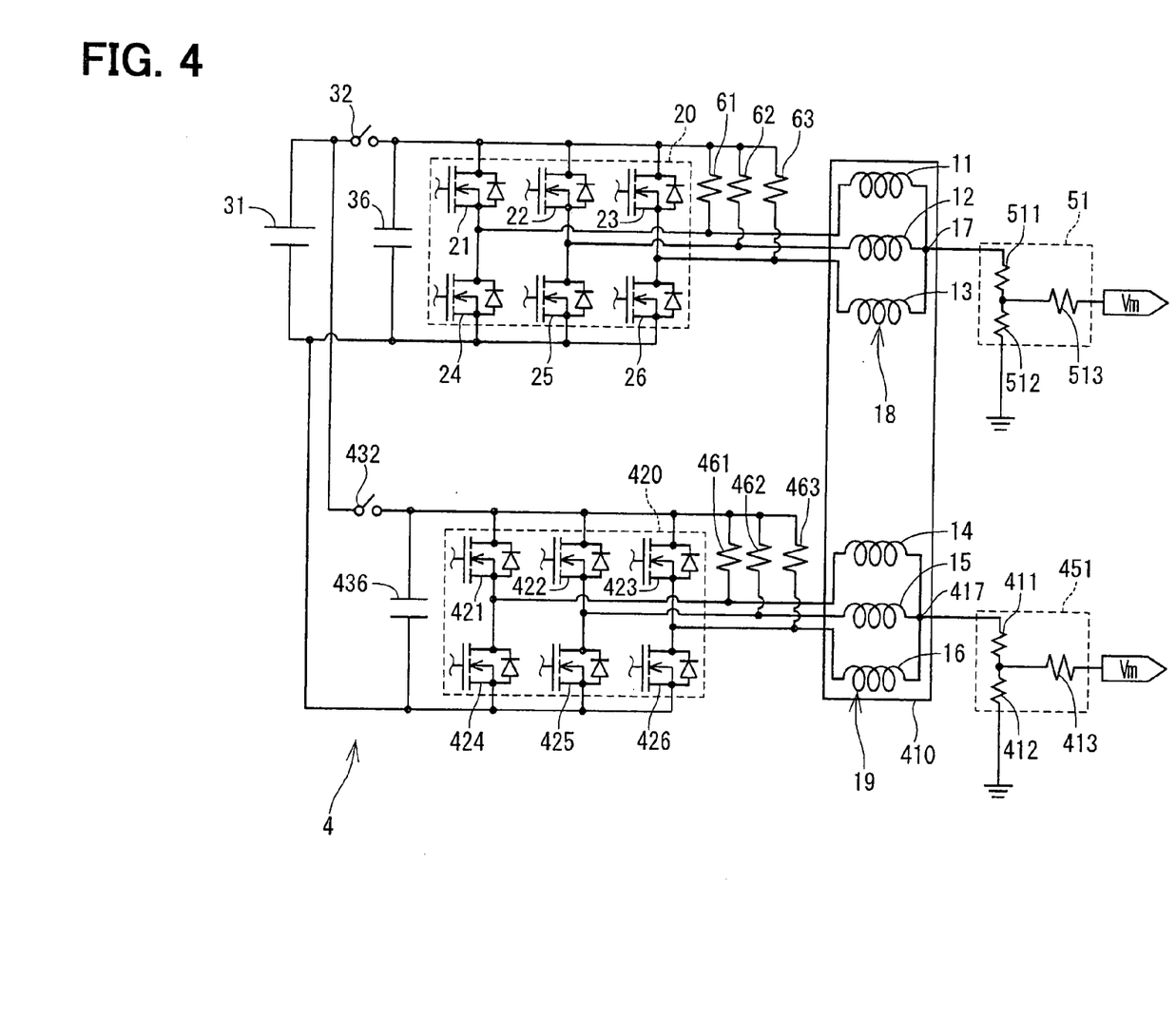
FIG. 4 is a schematic diagram showing an electric power conversion apparatus according to a third embodiment of the present invention.

In the foregoing embodiments, only one power supply system, which is formed of one winding set 18 and one inverter circuit 20, is provided. According to a third embodiment, as shown in FIG. 4, an electric power conversion apparatus 4 has a plurality of power supply systems. A detailed example of the electric power conversion apparatus 4, is described below.

In FIG. 4, the relay output voltage detection circuit 50, the pre-charge circuit 40, the microcomputer 70 and the like, which are shown in FIGS. 1 and 3, are not shown for brevity. It is assumed that coils 14 to 16 are counterparts of the coils 11 to 13, a winding set 19 is a counterpart of the winding set 18, an inverter circuit 420 is a counterpart of the inverter circuit 20, FETs 421 to 426 are counterparts of the FETs 21 to 26, a power source relay 432 is a counterpart of the power source relay 32, a capacitor 436 is a counterpart of the capacitor 36, a neutral point voltage detection circuit 451 is a counterpart of the neutral point voltage detection circuit 51, resistors 411 to 423 are counterparts of the resistors 511 to 513, and the resistors 461 to 463 are counterparts of the pull-up resistors 61 to 63.

According to the electric power conversion apparatus 4, a motor 410 has the winding set 18, which is formed of the U-phase coil 11, the V-phase coil 12 and the W-phase coil 13, and the winding set 19, which is formed of the U-phase coil 14, the V-phase coil 15 and the W-phase coil 16. The winding set 18 is supplied with current under switching control of the inverter circuit 20. The winding set 19 is supplied with current under switching control of the inverter circuit 420.

Similarly to the first embodiment, the electric power conversion apparatus 4 has the pull-up resistors 61 to 63 and 461 to 463 between the phases of the coils 11 to 16 and the high-potential side of the battery 31. The neutral point voltage detection circuit 51 detects the neutral point voltage developed at the neutral point 17. The neutral point voltage detection circuit 451 detects the neutral point voltage developed at the connection part 417. Abnormality in the system for the winding set 18 is detected based on the neutral point voltage developed at the neutral point 17 and detected by the neutral point voltage detection part 61. Abnormality in the system for the winding set 19 is detected based on the neutral point voltage developed at the connection part 417 and detected by the neutral point voltage detection part 451. The third embodiment thus provides the similar advantage as the first embodiment. Since the abnormality can be detected based on the neutral point voltage, advantage of reducing the number of parts becomes more evident in case that the winding set and the inverter part are provided in a plurality of sets.

According to the electric power conversion apparatus 4, similarly to the first embodiment, the pull-up resistors 61 to 63 and 461 to 463 are provided in correspondence to phases to detect the neutral point voltage. It is however possible to configure each power supply system similarly to the second embodiment and detect abnormality based on the pseudo-neutral point voltage. In this case, the abnormality can be detected based on the pseudo-neutral point voltage in addition to the advantage of the second embodiment. As a result, the advantage of reducing the number of parts for the voltage detection becomes more evident in case that the winding set and the inverter part are provided for each power supply system.

According to the second embodiment, the pull-up resistor 261 is provided only in the U-phase. However, as the other embodiment, it may be provided in any of the phases. The pull-up resistors may be provided in a plurality of phases. The coils 11 to 13 and 14 to 16 are connected in the Y-shape to form the winding set in the foregoing embodiments. However, in case that the pseudo-neutral point forming part 210 is provided as in the second embodiment, the coils may be connected in a Δ-shape to form a winding set.

According to the first embodiment, the pull-up resistors 61 to 63 have the same resistance. It is possible that the pull-up resistors 61 to 63 have different resistances among the phases as the other embodiment. In case that the pull-up resistors 61 to 63 have different resistances among the phases, the neutral point voltages Vm calculated by the equations (6), (8) and (10) become different one another. That is, the neutral point voltages differ depending on the location of wire breakage. It is thus possible to relatively readily specify the location of abnormality based on the neutral point voltages.

According to the foregoing embodiments, the power source relay 32 is turned on and the pre-charge relay 42 is turned off at S103 in FIG. 2. As the other embodiment, it is possible to turn off the power source relay 32 and turn on the pre-charge relay 42. In this case, the pre-charge voltage Vpre is used in place of the battery voltage Vpig in the equations (1) to (21). That is, the equations (1) to (21) are calculated by replacing Vpig with Vpre. The presence or absence of abnormality and the location of abnormality are specified based on either one of the calculated neutral point voltage and the pseudo-neutral point voltage and either one of the detected neutral point voltage and the pseudo-neutral point voltage. According to the foregoing embodiments, since the pre-charge relay 42 is turned on at S101, the capacitor 36 is already charged at S103. In case that the capacitor 36 is thus already charged, it is possible to perform the abnormality detection processing of S104 in FIG. 2 by turning off the pre-charge relay 42.

According to the foregoing embodiments, the winding set 18, 19 has three phases and the three-phase inverter 20, 420 is used. As the other embodiment, the number of phases need not be three but may be two or four or more. Although the motor 10 is used as the rotary machine in the electric power steering system, it may be used in different systems other than the electric power steering system. The rotary machine need not be a motor but may be a generator.

The present invention is not limited to the foregoing embodiments but may be implemented in different embodiments.

What is claimed is:

1. An electric power conversion apparatus for converting electric power of a power source supplied to a motor having a winding set, which is formed of coils corresponding to a plurality of phases, the electric power conversion apparatus comprising:
    an inverter part having a plurality of switching element pairs corresponding to the plurality of phases of the winding set, each of the switching element pairs being formed of a high-potential side switching element provided at a high-potential side of the power source and a low-potential side switching element provided at a low-potential side of the power source;
    resistors provided between the coils of the winding set and the high-potential side of the power source;
    a neutral point detection part for detecting a neutral point voltage of the winding set; and
    an abnormality detection part for detecting abnormality based on the neutral point voltage detected by the neutral point detection part wherein
    the resistors have different resistances among the plurality of phases of the winding set.

2. An electric power conversion apparatus for converting electric power of a power source supplied to a motor having a winding set, which is formed of coils corresponding to a plurality of phases, the electric power conversion apparatus comprising:

an inverter part having a plurality of switching element pairs corresponding to the plurality of phases of the winding set, each of the switching element pairs being formed of a high-potential side switching element provided at a high-potential side of the power source and a low-potential side switching element provided at a low-potential side of the power source;

a first resistor provided between one of the coils of the winding set and the high-potential side of the power source;

a plurality of second resistors, each of the plurality of second resistors having one end connected to the plurality of coils of the winding set and other end connected to a connection part;

a neutral point detection part for detecting, as a neutral point voltage of the winding set, a voltage developed at the connection part; and an abnormality detection part for detecting abnormality based on the neutral point voltage detected by the neutral point detection part; wherein the plurality of second resistors have different resistances among the plurality of phases of the winding set.

* * * * *